Patented Feb. 27, 1945

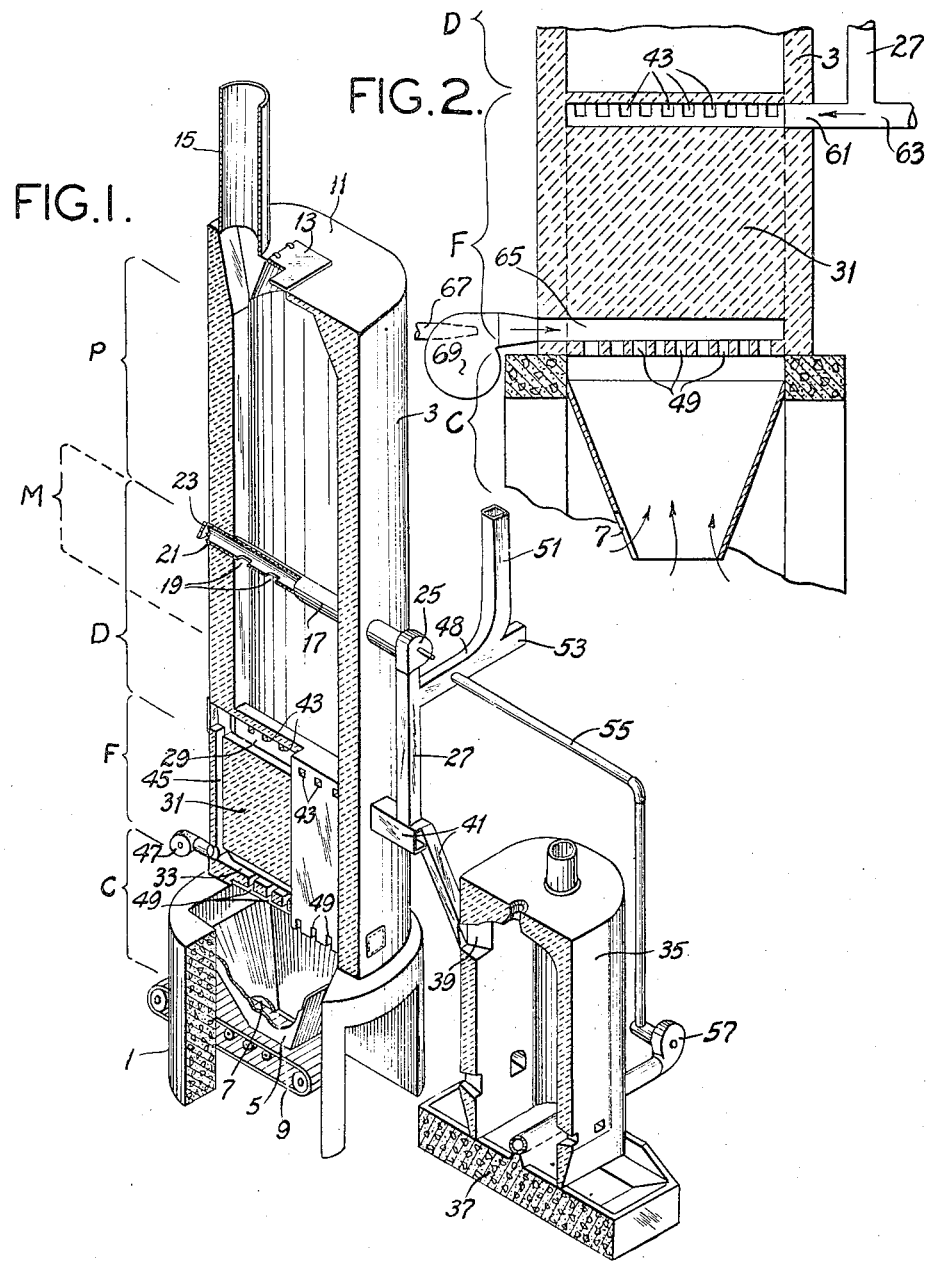

2,370,281

UNITED STATES PATENT OFFICE 2,370,281

CALCINING APPARATUS

Victor J. Azbe, Webster Groves, Mo.

Application November 4, 1942, Serial No. 464,461

10 Claims. (Cl. 263—29)

This invention relates to calcining apparatus and the lime product thereof, and with regard to certain more specific features to a kiln for burning either high-calcium or dolomitic limestone to produce an improved oxide.

The present invention is an improvement upon the apparatus shown in my United States Patent 2,199,384, dated May 7, 1940.

Among the several objects of the invention may be noted the provision of apparatus for producing a high grade lime of fine, honeycombed structure; the provision of such a lime which will produce a hydrate which will accept water immediately, thus in the case of dolomitic hydrate eliminating the long period of soaking formerly required for accepting the water; the provision of either a dolomitic or high-calcium lime which will produce a hydrate which when worked up into a putty will not have granulations and which will have superior workability and covering power; the provision of either a dolomitic or high-calcium lime which will produce a hydrate which will have superior chemical solubility, reactivity, availability and settling rate; and the provision of apparatus of the class described having an improved heat efficiency. Other objects will be in part obvious and in part pointed out hereinafter.

The invention accordingly comprises the steps and sequence of steps, elements and combinations of elements, features of construction, and arrangements of parts which will be exemplified in the structures hereinafter described, and the scope of the application of which will be indicated in the following claims.

In the accompanying drawing, in which is illustrated several of various possible embodiments of the invention, Fig. 1 is a sectional perspective view of apparatus for carrying out my invention; and, Fig. 2 is a fragmentary vertical section corresponding to the lower portion of Fig. 1, but showing an alternative arrangement.

Similar reference characters indicate corresponding parts throughout the several views of the drawing.

Good lime has a fine, delicate honeycombed structure which is destroyed by high temperatures. Therefore, lime cannot be at its best except when it is burned at minimum temperature, and minimum temperature cannot be maintained effectively in ordinarily arranged kilns without greatly impairing their producing capacity and their fuel efficiency. The prior schemes were incorrect in the fundamental idea of conserving heat at high temperature elevation. Heat conservation is essential to economic production of lime. These systems also were as relatively ineffective in attaining the desired temperature control.

Lime is burned ordinarily in a low volume of high temperature gases, whereas it should be burned in a high volume of low temperature gases. However, in attaining this high volume and low temperature there must be a minimum loss of heat.

Most kilns of today are generally very uniform as to heat, lime flow and gas flow, and far too hot in one section and too cool in other sections. Therefore, lime coming from one point may be badly overburned and from another underburned, this latter containing both core as well as reabsorbed $CO_2$ in its recarbonated portions.

As a result, lump lime itself, as also the hydrate made from this lime, lacks the full quota of desired characteristics for chemical purposes, such as proper solubility, reactivity, availability and settling rate; and in the construction field, of body, plasticity, workability, sand carrying capacity, fill-in power, adhesiveness, etc. This is particularly true of dolomitic lime which, in addition to increasing difficulties of application, tends occasionally to give trouble, often many years later, through popping or blistering of finish coat plasters.

Dolomitic lime is particularly sensitive and readily damaged by high temperatures, because it has two main components, one of which, magnesium oxide, forms at much lower temperatures than the other, namely, calcium oxide. When exposed to heat, magnesium oxide crystallizes into cubical crystals of variable size and density. At higher heat and longer time of exposure in lime kilns, these crystals become more dense and grow to a relatively larger size. Due to their density any hydrating action can take place only at the outer surface, and due to the large size, there is relatively less outer surface available. As surface is needed for activity, lack of this surface makes the magnesium portion of the lime relatively inactive and almost completely unavailable, with the likelihood of delayed activity at an undesirable time.

At lower temperatures of calcination, the resulting smaller cubical crystals, of lower density, present a greater outer as well as an inner surface area. With more exposed surface the rate of hydration, a surface reaction, increases proportionately, and the resulting dolomitic hydrate, properly hydrated, instead of being composed in a great measure of the inert large crystals of MgO, has a good proportion of the very minute Mg(OH)$_2$ crystals.

The fundamental masses of the calcium oxide component of lime (if not formed at overly high temperatures) are smaller and more porous, and thus more advantageous. This calcium oxide is also impaired by elevated temperatures but not as much as magnesium oxide. This is due mainly to two reasons; first, its tendency is not to form large dense crystals but rather those of a smaller and more open type; and second, calcium oxide is normally never heated to such high excess temperatures above its dissociation level as magnesium oxide. The magnesium oxide may, for example, pass through the kiln hot zone at a temperature of 2500° F., or practically 1500° F. in excess of its approximate lower dissociation temperature of 1000° F. The corresponding excess in the case of calcium oxide under these conditions would be only about 900° F. above its approximate dissociation temperature of 1600° F.

According to one example of the present invention, gas is withdrawn from the kiln at about 1000° F. and returned to the kiln hot zone, reducing the hot zone temperature from 2500° F. to 2200° F. or even less (1800° F. or less) if so desired. Incidentally, I have found that the magnesium carbonate has two dissociation temperatures, according to whether it is heated slowly or quickly, the lower one of which is at about said 1000° F.

Heat low in elevation, that is below 1350° F. in high-calcium kilns and below 950° F. in dolomitic kilns, is spent and ordinarily is utilized only for preheating of stone. But it is known that kilns have more heat of low elevation available than is necessary for stone preheating, that is, more gas of this temperature passes up the stone preheating and stone storage sections of the kiln than is needed for stone coming down the kiln. Since natural draft kilns, particularly dolomitic kilns with their low average temperature, are deficient in capacity, due to low available draft, it is, of course, objectionable for them to handle the excess gas, as this only tends to reduce still more their already low capacity.

A part of the present process includes the withdrawal of hot gases from the end of the calcium-dissociation zone in the case of high-calcium lime kilns or from within the magnesia-dissociating zone in the case of high-magnesia lime kilns; and the use of these excess gases for circulation to gas producers, or for production of chalk, dry ice, air preheat, drying, or any other CO$_2$ utilizing process.

Thus, the kiln becomes relieved, which immediately shows up as increased draft in the hot zone, resulting in bringing in greater quantities of air and allowing admission of a larger amount of combustible, all resulting in greater lime producing capacity of the unit.

The kiln thus has a mild induced draft, with the distinction from former induced draft kilns that the kiln top may be open and stone can be charged at any time rather than at the definite periods ordinarily necessary. Increased capacity brought about in this way also increases efficiency through reduction of radiation loss, etc.

I also utilize kiln gases in a gas producer which serves the kiln, in order to increase efficiency. By the above means, I allow for recirculation of a greater quantity of gases, maintenance of a lower temperature in the hot zone, and increase in efficiency. At the same time, I provide for preheating air needed for the gas producer and effect certain cooling functions of the gas-withdrawing apparatus.

I also avoid overburning during the later processing periods in the kiln by means of a specially fired finishing zone below the calcining zone.

Referring now more particularly to Fig. 1, there is shown at numeral 1 a foundation for a hollow refractory kiln column or shaft 3. The shaft 3 communicates at the bottom with a hopper 5 having an opening 7 leading to a take-off conveyor 9. Air may enter the bottom of hopper 5.

At the top of the shaft 3 is an end 11 in which is a charging door 13 and beyond which passes a waste-gas outlet 15. Throughout, refractory materials are used where necessary.

The limestone passage constituted by the shaft 3 and the hopper 5 is divided up into zones as follows: a preheating zone P; a dissociation zone D; a finishing zone F; and a cooling zone C. About at the end of zone D is a gas offtake pipe 17 of suitable heat-resistant material. This pipe 17 extends diametrally across the shaft 3 and has gas inlet openings on its under side, as indicated at 19. It has on one end an air inlet opening at 21 under control of an adjustable draft door 23, for preventing overheating of the pipe and for supplying all the air needs of a gas producer, to be mentioned. The pipe extends out on the opposite side of the shaft 3 into communication with an induction fan 25 which directs gases down to a pipe 27, a waste pipe 51, a CO$_2$ process pipe 53 and a pipe 55 leading to a gas producer 35.

The pipe 17 is substantially at the top of the dissociation zone D throughout which calcium dissociation occurs in the case of a high-calcium kiln. It is to be understood that the top of this zone fluctuates somewhat depending on kiln operation, and that its upper end may sometimes be slightly below the pipe 17. However, the arrangement is such that in a high-calcium kiln the upper end of this zone does not go substantially above the pipe because this would subject the pipe to excessive temperatures. It should be noted that in the case of high-calcium dissociation the end of the calcium-dissociation zone is a relatively narrow strip.

In the case of a high-magnesium or dolomitic kiln the upper part of the dissociation zone D becomes the magnesium-dissociation zone M, which is broad (from five to eight feet in extent) and of low temperature (of the order of 1000° F.). Therefore it is intended that the pipe 17, while always at the top or above the high-calcium-dissociation zone, shall be near the top or within this broad band M of magnesium dissociation in kilns in which magnesium dissociation occurs. For example, if the construction shown in Fig. 1 were operated as a dolomitic kiln, the magnesium-dissociation region would be indicated at M and the high-calcium-dissociation region would then be below this. Thus in the case of the dolomitic kiln M would be the magnesium-dissociation region and D minus M would be the calcium-dissociation region, the latter being hotter than the former. If desired, the pipe 17 could be carried lower in the case of a dolomitic kiln but not below the bottom of the magnesium-dissociation region.

The lower end of the dissociation zone D for either high-calcium or dolomitic kilns is approximately at the upper firing passage 29 of a vertical, slab-like bridge wall 31 which extends across the interior of the shaft.

The finishing zone F is between said upper firing passage 29 in the bridge wall 31 and a lower firing passage 33 in this bridge wall.

The cooling zone C is between the lower firing passage 33 in the bridge wall 31 and the outlet 7 at the bottom of the hopper 5.

It will be clear from Figs. 1 and 2 that material which gravitates through the shaft 3 divides and passes down on opposite sides of the transverse bridge wall 31.

At 35 is shown a small gas producer mounted on a foundation 37 having a gas outlet 39 which, through a passage 41, feeds producer gas to the upper burner passage 29. Passage 29 has lateral outlets 43 into the interior of the shaft 3 from which external burning occurs in the material within the shaft. Combustion from shaft 3 is substantially external because not until the gas leaves the opening 43 is it encountered by substantial enough amounts of air for the purpose rising from below.

The gas plant may take the form of one large gas producer feeding gas to a series of kilns but the mode of operation remains substantially the same as described above.

Not all of the gas furnished to passage 29 by the producer 35 needs to be expelled from the ducts 43. The excess may be led down through a duct 45 and to said bottom passage 33 in the bridge 31. Upon entering the passage 33, the gas meets with a stream of air from a blower 47. A combustible mixture is thus formed which burns in the passage 33. Thus substantial internal burning occurs in this passage and the products of combustion pass through openings 49 into the shaft 3.

The purpose of the pipe 27 is to recirculate to the base of the dissociation zone D a substantial volume of the $CO_2$ gases withdrawn over pipe 17. These are re-introduced along with combustible gas in the passage 29. They furnish a substantial amount of heat at a desirably low temperature head, which heat in other forms of recirculation would otherwise need to be furnished by the use of more producer gas.

The gases leaving the calcining zone at, but not in, the pipe 17 are preferably at a temperature of about 1000° F. in the case of a dolomitic rock kiln, but may be as high as 1350° F. in the case of a high-calcium rock kiln. The introduction of air at 21, is enough to provide the producer 35 with its needed air and also serves to cool the pipe 17 and the fan 25. Thus the air for producer 35 is preheated.

Gases from pipe 17 also return to the bottom of the dissociation zone D. The cooling effect of no other zone is impressed upon them. The effect is therefore not so much to cool the dissociation zone (as has heretofore been the practice), but simply to mix hot but relatively cooler gases from its upper end with inflowing much hotter products of combustion, whereby desired even temperature distribution is easily obtained along with a high heating efficiency.

In the case of a high-calcium kiln, about 50% by volume of air is permitted to be drawn in at the opening 21. In the case of a dolomitic kiln, 5% or less air is permitted to enter the opening 21.

Not only is enough gas withdrawn over the pipe 17 to furnish recirculation, but more is withdrawn because not needed anyway in the preheating zone P. This is for the purpose of utilization in processes, as for the production of chalk, dry ice, air preheating, drying, other $CO_2$-utilizing processes, or other gas producers. This large-volume withdrawal in excess of recirculation needs, tends to avoid the choking-up effect which occurred in prior recirculating systems wherein low volumes of relatively cold gases were abstracted from above the preheating zone. In fact the present kiln operates with a mild induced draft effect in the dissociation zone.

Gases leaving the blower 25 which are not used for recirculation through the pipe 27 pass over a pipe 48, some, if necessary, being sent to waste over the pipe 51 and some to said industrial uses over the pipe 53.

It may be here mentioned that considering the time element the amount of air drawn in at the gate 23 is not sufficient to cause any substantial internal combustion in passage 29 but it is enough to supply the needs of the producer 35. The thermodynamic efficiency of the system is increased by reason of the fact that the gas producer 35 makes use of the air and $CO_2$ gas abstracted by the take-off 17 (see pipe 55 and blower 57).

Other fuel can be delivered to the passage 29, such as for example an oil spray or the like, if the gas producer is eliminated.

In Fig. 2 is shown an alternative construction, wherein natural gas is used as a fuel, recirculation from the pipe 17 being introduced through pipe connection 27 at point 61 and the natural gas at point 63. These gases escape from the openings 43 for combustion in the shaft 3. These parts form the equivalent of the upper passage 29 in Fig. 1.

The equivalent of the lower passage 33 in Fig. 1 is shown at 65 in Fig. 2. It does not receive fuel from the upper passage, but from a natural gas nozzle 67. The gas from the nozzle 67 enters passage 65 with excess air from a blower 69.

Air enters the cooling zone C from below and passes up, cooling the lime on its way. At a higher point (passage 65) the second air stream flowing from blower 69 is admitted through opening 49, and this stream contains a portion of the natural gas fuel in thorough mixture. Such an excess of air comes from the blower 69 that the mixture does not burn in the duct 65, and to this extent this scheme is different from that shown in Fig. 1, wherein burning does occur in the duct 33.

Thus, in the present example, the mixture from duct 65 enters the kiln shaft before burning and is distributed with the air stream coming from the cooling zone. The combination of the first and second air streams with the natural gas passes upward into the finishing zone F, at first without combustion, until a point is reached in zone F where the temperature is high enough for combustion, and at this time the pre-mixed gas ignites and helps to maintain the desired finishing zone temperature (1650° F.). At the junction between the finishing zone F and the dissociation zone D, the further addition of natural gas satisfies for combustion the balance of oxygen in the air stream coming up from the cooling zone C and finishing zone F. The purpose of the finishing zone air stream is to distribute the finishing zone natural gas into such a large volume that when injected into the kiln shaft it will quickly and thoroughly mix with the air coming up from the cooling zone. This effect could not be obtained by mere injection of natural gas which would burn with a short, sharp and hot flame.

The amount of natural gas used is such that when mixed with both air streams it will not ignite immediately but it cools the lime and at the same time preheats itself until the hot combustion level is reached.

Various features of the invention will be clarified by the following discussion:

Calcination takes place primarily in the dissociation zone, and some takes place in the finishing zone F. By means of the internal firing with producer gas in the lower bridge passage 33 (Fig. 1), the final calcination, just before cooling (at the bottom of the finishing zone), is carried out under better conditions of gas distribution than if external firing occurred from the passage 33. On the other hand, by means of delayed external firing of natural gas from the lower bridge passage (Fig. 2) similar effects are obtained in the case of natural gas fuel.

Also, recirculation of a substantial volume of gases from the top of the disassociation zone into the externally firing upper passage 29 prevents any necessity for overheating at the level of said passage 29, with better distribution of gases at that level.

A high volume circulation is maintained in the dissociation zone of well-distributed gases, and the kiln has a high thermodynamic efficiency. Also, instead of using additional fuel as heretofore in connection with recirculating gases from the top of the preheating zone P that have already spent their heat, relatively higher temperatures of recirculating gases are used by abstracting from the top of the dissociation zone. With this type of recirculation of a large volume of gases it is easier to obtain in the dissociation zone an equal temperature condition throughout the entire kiln section, besides saving heat. In addition, the equal-temperature conditions over the kiln section are maintained on down through the finishing zone.

There is no danger in robbing the preheating zone by this procedure, because there is ample gas anyway for preheating. The effect, also of the high volume recirculation is to relieve the kiln of a volume of gases which heretofore tended to choke it up.

The increased thermodynamic efficiency is basically due to the fact that recirculation occurs before a substantial length of the shaft 3 in the preheating zone is traversed by the recirculating gases, and therefore they are not subjected to cooling losses through this preheating zone which does not need them anyway.

Another advantage of the invention is that the kiln may be slipped when drawing, rather than hung to trim, which latter greatly complicates operation. This advantage is due to the better equalization and lowering of temperatures. The result is that continuous and automatic or semi-automatic draw can be readily utilized.

The finishing zone F used herein is especially advantageous. The temperature within this zone is considerably less than in the hot zone above, but yet never less than the dissociation temperature of calcium carbonate in 100% $CO_2$ atmosphere, namely 1648° F.

So-called finishing zones, or soaking pits, were utilized before but none were very practical as they tended to operate mainly on the principle of retaining the sensible heat of the lime coming from the hot zone and were expected to distribute this heat and calcine out the remaining core. As sensible heat content was small the benefit also was small, with the disadvantage that $CO_2$ escaping from the inner hotter portions was reabsorbed by the outer layers after same became cooled below dissociation temperature. Since reabsorption (that is, recarbonation just under the calcination temperature), was virtually instantaneous, even when there was a reduction of apparent core, the good lime became partially recarbonated.

Finishing zones to be effective must be heated, but not by direct application of a combustible, as then general low temperatures are impossible. In the flame and surrounding it, temperature always is too hot so heat must be applied by a considerable mass of preheated gases, then uniform temperature of proper elevation may be expected to prevail throughout the finishing zone.

As the lime from the hot zone retains all of its sensible heat, which is used to calcine the core, the finishing duct supplies only what more is needed to maintain the desirable temperature in the finishing zone. The great mass of air still comes from the cooler and is fully preheated by the lime, but if not, the additional heat is obtained from the finishing duct.

The finishing zone is of proper dimensions so that lime stays therein a definite time which, in kiln designing, can be varied, as for example: three-fourths calcination in the hot zone and one-fourth in the finishing zone, or more or less. The softer the lime is to be burned the more work is assigned to the finishing zone.

With all this another important gain is secured. Due to higher excess air in the mixture coming down from the finishing zone duct mixed further with air coming from the cooler, the gases in the finishing zone are very low in $CO_2$, a desirable condition. It in a measure corresponds to vacuum dissociation.

Other finishing zones and soaking pits which rely entirely on sensible heat have, by force of circumstances, a high $CO_2$ concentration, which tends to lower the calcination rate at any given temperature. In addition, there is danger of recarbonation, i. e., reabsorption of $CO_2$ since if temperature drops the least bit at this temperature level, the oxide can take $CO_2$ on even faster than the carbonate can pass it off, all depending on which way the temperature directs the process.

In the case of Fig. 1, since the duct 33 receives a small amount of combustible and a considerable amount of air premixed, combustion takes place within the duct and this condition gives as products a mixture relatively low in temperature, low in $CO_2$, and high in excess air, and this is drawn into the kiln below the finishing zone. A similar condition of low temperature and low $CO_2$ is obtained in the finishing zone of Fig. 2. Due to the relatively large volumes in both gases, distribution and mixture are good. The resulting lime contains less core, and less residual $CO_2$ due to less recarbonation.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. Calcining apparatus comprising a vertical kiln shaft, a firing means in said shaft, a gas take-off above said firing means, said firing means determining substantially the lower end of a dissociation zone and the gas take-off being positioned substantially near or below the upper end of said dissociation zone, a finishing zone below the dissociation zone, means for recirculating gases from said take-off and back into the dissociation zone by way of said firing means and above the finishing zone, means for introducing air with said gases, said air passing in heat-exchange relation to said take-off and being sufficient to cool it and to preserve it but insufficient for complete combustion in the firing means, and means for introducing into the shaft from below said firing means air required for complete combustion in the shaft but outside and above of said firing means.

2. Calcining apparatus comprising a vertical kiln shaft, a firing bridge across said shaft, a gas take-off above said firing bridge, said bridge determining substantially the lower end of a dissociation zone and the gas take-off being positioned substantially near or below the upper end of said dissociation zone, means for recirculating gases from said take-off and back into the dissociation zone by way of said firing bridge, means for introducing air with said gases, said air passing in heat-exchange relation to said take-off and being sufficient to cool it and to preserve it but insufficient for complete combustion in the firing bridge, and means for introducing into the shaft from below said firing bridge air required for complete combustion in the shaft but outside and above of said bridge.

3. Calcining apparatus comprising a vertical shaft, a firing bridge wall across said shaft having upper and lower firing passages serially connected, a gas take-off above said firing bridge, the top of said bridge determining the lower end of a dissociation zone and the gas take-off being positioned no higher than the upper end of said dissociation zone, said passages determining a finishing zone, means for recirculating gases from said take-off and back into the dissociation zone by way of said passages in the firing bridge, means for introducing fuel into the upper passage without air, whereby said bridge fires externally in the shaft, means for introducing air into said lower firing passage with fuel which it receives from the upper passage, said lower passage constituting an internally fired passage introducing products of combustion at a lower point in said shaft, said shaft being formed as a cooling zone below said finishing zone and having opening means therebelow for introduction of air.

4. In calcining apparatus, a shaft, a firing means across the interior of said shaft, said firing means having an upper firing passage and a serially connected lower firing passage for receiving from the upper passage excess gases therein.

5. In calcining apparatus, a shaft, firing means across the interior of said shaft, said firing means having an upper firing passage and a lower firing passage, both passages having firing openings into the shaft, means for introducing combustible with insufficient air for combustion into said upper firing passage whereby it becomes externally firing into the shaft, means for introducing fuel into the lower passage along with air enough for internal firing, the passages being serially connected so that the lower one receives from the upper one excess unburned gases which fail to escape from the openings of the upper passage.

6. Calcining apparatus comprising a kiln having a shaft in which is a dissociation zone, a gas producer, a firing inlet for the kiln substantially at the bottom of the dissociation zone, a connection from said gas producer to said firing inlet, a $CO_2$ offtake in the kiln above said inlet, a connection from said offtake to the gas producer for feeding $CO_2$ thereto, and means for bleeding air into said off-take from the exterior in quantities required by the gas producer and sufficient to preserve the off-take against overheating.

7. Calcining apparatus comprising a shaft having a dissociation zone and a finishing zone, a gas take-off in said shaft for carbon dioxide located no higher than the top of the dissociation zone, an external-firing passage located across said shaft at the bottom of the dissociation zone, means for recirculating gases from said take-off into said firing passage, a second firing passage located across said shaft below said first firing passage, said second passage being located at the bottom of the finishing zone, means for introducing air into said second passage to make it internally firing, and means for feeding fuel serially through the first and second passages successively, the amount of fuel being in excess of the requirements for firing from said first passage.

8. Calcining apparatus comprising a shaft, a gas take-off in said shaft for $CO_2$ gases located at a point substantially at or below the top of the dissociation zone in said shaft, a firing passage located across said shaft substantially at the bottom of the dissociation zone, means for introducing fuel into the firing passage, means for recirculating $CO_2$ gases from said take-off into said firing passage to highly heat the fuel therein, and means for bleeding a sufficient quantity of air through said take-off within the shaft to preserve it but insufficient to support complete combustion in the firing passage or substantially to cool the fuel therein.

9. Calcining apparatus comprising a kiln having a shaft, a gas producer, a firing inlet for the kiln, a connection from said gas producer to said firing inlet, a $CO_2$ take-off in the kiln above said inlet, means for bleeding air into said take-off from the exterior in quantities required by the gas producer and sufficient to preserve the take-off, and a connection from said take-off to the gas producer for feeding both air and $CO_2$ thereto.

10. Calcining apparatus comprising a kiln having a shaft, a gas producer, a firing inlet for the kiln substantially at the bottom of a dissociation zone, a connection from said gas producer to said firing inlet, a $CO_2$ take-off in the kiln above said inlet and substantially at or below the top of the dissociation zone, a connection from said take-off to the gas producer for feeding $CO_2$ thereto, a direct connection from said take-off to said firing inlet and by-passing said producer, and means for bleeding air into said take-off from the exterior in quantities required by the gas producer and sufficient to preserve the take-off but insufficient to support complete combustion in the firing inlet.

VICTOR J. AZBE.